United States Patent
Bisson et al.

(10) Patent No.: US 12,545,613 B2
(45) Date of Patent: Feb. 10, 2026

(54) APPARATUS FOR FORMING A GLASS RIBBON

(71) Applicant: CORNING INCORPORATED, Corning, NY (US)

(72) Inventors: Antoine Gaston Denis Bisson, Painted Post, NY (US); Philippe Dardart, Beaumont du Gatinais (FR); Bruno Le Gallic, Fontainebleau (FR); Xavier Tellier, Cheroy (FR)

(73) Assignee: CORNING INCORPORATED, Corning, NY (US)

( * ) Notice: Subject to any disclaimer, the term of this patent is extended or adjusted under 35 U.S.C. 154(b) by 276 days.

(21) Appl. No.: 18/259,425

(22) PCT Filed: Jan. 4, 2022

(86) PCT No.: PCT/US2022/011084
§ 371 (c)(1),
(2) Date: Jun. 27, 2023

(87) PCT Pub. No.: WO2022/150281
PCT Pub. Date: Jul. 14, 2022

(65) Prior Publication Data
US 2024/0051864 A1 Feb. 15, 2024

Related U.S. Application Data

(60) Provisional application No. 63/135,029, filed on Jan. 8, 2021.

(51) Int. Cl.
*C03B 17/06* (2006.01)
(52) U.S. Cl.
CPC ......... *C03B 17/068* (2013.01); *C03B 17/067* (2013.01)

(58) Field of Classification Search
None
See application file for complete search history.

(56) References Cited

U.S. PATENT DOCUMENTS 8,459,062 B2 * 6/2013 Ahrens ............... C03B 17/064
65/195
8,707,737 B2 * 4/2014 Chalk ................. C03B 17/064
65/92

(Continued)

FOREIGN PATENT DOCUMENTS

| CN | 102050562 A | 5/2011 |
| CN | 104203846 A | 12/2014 |

(Continued)

OTHER PUBLICATIONS

PE2E machine translation JP 2002167226 (Year: 2002).*

(Continued)

*Primary Examiner* — Jodi C Franklin
(74) *Attorney, Agent, or Firm* — Matthew J. Mason

(57) ABSTRACT

In some embodiments, apparatus and methods for forming a glass ribbon can comprise a support member to move a draw stack along a support surface. In some embodiments, a housing can define an exterior area positioned outside of the wall of the draw stack and between the downstream portion of the draw stack and the housing. The housing can comprise a vent configured to regulate gas flow through the vent from the exterior area to a location outside of the housing and outside of the draw stack. In some embodiments, the draw stack can comprise first gate and a second gate. Each gate can be provided with a corresponding row of conduits to cool a central edge plate.

19 Claims, 9 Drawing Sheets

(56) References Cited

U.S. PATENT DOCUMENTS

| | | | |
|---|---|---|---|
| 9,598,301 B2* | 3/2017 | Fournel | C03B 17/067 |
| 9,758,418 B1* | 9/2017 | El-Kahlout | C03B 17/064 |
| 2011/0100056 A1 | 5/2011 | Anderson et al. | |
| 2011/0126591 A1* | 6/2011 | Chalk | C03B 17/067 65/84 |
| 2012/0111055 A1* | 5/2012 | Allan | C03B 17/067 65/29.18 |
| 2013/0133368 A1* | 5/2013 | Fournel | C03B 17/067 65/53 |
| 2014/0318182 A1* | 10/2014 | Coppola | C03B 17/067 65/29.21 |
| 2018/0370836 A1* | 12/2018 | Aniolek | C03B 17/067 |
| 2020/0095154 A1* | 3/2020 | Hsiao | C03B 17/064 |
| 2022/0081340 A1* | 3/2022 | Amosov | C03B 7/07 |

FOREIGN PATENT DOCUMENTS

| | | | | |
|---|---|---|---|---|
| CN | 104379517 B | * | 8/2017 | C03B 17/064 |
| CN | 109311722 A | | 2/2019 | |
| CN | 111574037 A | * | 8/2020 | C03B 25/12 |
| JP | 1933124826 | * | 5/1993 | C03B 17/064 |
| JP | 2002167226 A | * | 6/2002 | C03B 17/064 |
| JP | 2012167014 A | * | 9/2012 | C03B 17/068 |
| JP | 2017-014075 A | | 1/2017 | |
| KR | 10-2011-0047164 A | | 5/2011 | |
| KR | 20140105747 A | * | 9/2014 | C03B 17/067 |
| KR | 20190098951 A | * | 8/2019 | C03B 40/033 |
| KR | 20200119780 A | * | 10/2020 | C03B 18/02 |
| TW | 201127759 A | | 8/2011 | |
| WO | WO-2012132425 A1 | * | 10/2012 | C03B 17/064 |
| WO | WO-2013046683 A1 | * | 4/2013 | C03B 18/20 |
| WO | 2017/095791 A1 | | 6/2017 | |
| WO | WO-2018088031 A1 | * | 5/2018 | H01L 21/677 |
| WO | WO-2019027784 A2 | * | 2/2019 | C03B 17/068 |
| WO | WO-2020055635 A1 | * | 3/2020 | C03B 17/067 |
| WO | WO-2020170748 A1 | * | 8/2020 | C03B 17/068 |

OTHER PUBLICATIONS

PE2E machine translation WO 2018088031 (Year: 2018).*
PE2E machine translation JP2021100903 (Year: 2021).*
Chinese Patent Application No. 202280015699.1, Office Action dated Apr. 17, 2025, 4 pages (English Translation only), Chinese Patent Office.
Invitation to Pay Additional Fee; PCT/US2022/011084; dated Apr. 28, 2022; 12 pages; European Patent Office.
Korean Patent Application No. 10-2023-7026513, Office Action dated Aug. 19, 2025, 8 pages (English Translation only), Korean Patent Office.
Taiwanese Patent Application No. 111100504, Office Action dated Jul. 15, 2025, 2 pages (English Translation only), Taiwanese Patent Office.

* cited by examiner

APPARATUS FOR FORMING A GLASS RIBBON

CROSS-REFERENCE TO RELATED APPLICATIONS

This is a national stage application under 35 U.S.C. § 371 of International Application No. PCT/US2022/011084 filed on Jan. 4, 2022, which claims the benefit of priority under 35 U.S.C. § 119 of U.S. Provisional Application No. 63/135,029, filed on Jan. 8, 2021, the content of which is relied upon and incorporated herein by reference in their entireties.

FIELD

The present disclosure relates generally to apparatus for forming glass and, more particularly, to apparatus for forming glass ribbon.

BACKGROUND

Early foldable smartphones and other electronic devices included a display incorporating a plastic substrate. Plastic substrates are capable of being repeatedly bended or folded without experiencing elastic deformation, but have a surface that is easily scratched or otherwise damaged, giving an exposed surface of the plastic substrates an unsightly appearance. Further, plastic substrates are known to have a relatively-high coefficient of thermal expansion ("CTE"), requiring thick plastic substrates that have enough strength to withstand the repeated bending and folding. However, thick plastic substrates increase the overall electronic device thickness, and can interfere with the sensitivity of the display.

A glass ribbon, on the other hand, has more-recently been used in the construction of displays for foldable/bendable electronic devices. A glass ribbon has a relatively low CTE compared to plastic, and can thus form a display substrate that is thinner than plastic, while still achieving comparable attributes. Further, glass ribbons can be more-resistant to scratching and other such damage, and sleeker in appearance. However, the attributes and structure of glass ribbons are sensitive to fluctuations in manufacturing parameters such as temperature, for example, that must be maintained within a small tolerance of a target value. To maintain such manufacturing parameters, the apparatus for manufacturing glass ribbons require regular maintenance, with limited downtime.

SUMMARY

Some example embodiments of the disclosure are described below with the understanding that any of the embodiments may be used alone or in combination with one another.

In some embodiments, an apparatus for forming a glass ribbon can comprise a draw stack comprising a wall circumscribing an interior area comprising an inlet, and an outlet located downstream from the inlet. The draw stack can further comprise at least one pull stage within the interior area. Each pull stage of the at least one pull stage can comprise a first pair of rollers configured to grip a first outer edge of the glass ribbon and a second pair of pull rollers configured to grip a second outer edge of the glass ribbon. The apparatus can further comprise a support member movable from a retracted position to an extended position to increase an elevation of the draw stack. The support member can be movable between the extended position to the retracted position to reduce the elevation of the draw stack. The support member can comprise an end portion.

In some embodiments, the apparatus can further comprise a track receiving the end portion of the support member to define a lateral travel path of the draw stack.

In some embodiments, the end portion comprises a wheel.

In some embodiments, the end portion comprises an air bearing.

In some embodiments, the apparatus can further comprise a lateral lock comprising a protrusion and a recess configured to receive the protrusion.

In some embodiments, a method can comprise moving a glass ribbon in a downward direction through an interior area of a draw stack while the draw stack is supported on a support surface and while an inlet of the interior area of the draw stack is aligned to receive the glass ribbon. The method can further comprise moving the draw stack in a horizontal direction relative to the support surface such that the inlet of the interior area is not aligned to receive the glass ribbon.

In some embodiments, after moving the draw stack, the method can comprise continuing to move the glass ribbon in the vertically downward direction without passing through the interior area of the draw stack.

In some embodiments, the horizontal direction can be defined by a track mounted relative to the support surface.

In some embodiments, the draw stack can be levitated on a cushion of gas while moving the draw stack in the horizontal direction.

In some embodiments, the method can further comprise lifting the draw stack in a vertically upward direction prior to moving the draw stack in the horizontal direction.

In some embodiments, the lifting the draw stack unlocks the draw stack to permit movement of the draw stack in the horizontal direction.

In some embodiments, prior to the moving the draw stack in the horizontal direction, the method can further comprise unlocking the draw stack to permit movement of the draw stack in the horizontal direction.

In some embodiments, an apparatus for forming a glass ribbon can comprise a draw stack comprising a wall circumscribing an interior area comprising an inlet and an outlet located downstream from the inlet. The draw stack can further comprise at least one pull stage within the interior area. Each pull stage of the at least one pull stage can comprise a first pair of rollers configured to grip a first outer edge of the glass ribbon and a second pair of pull rollers configured to grip a second outer edge of the glass ribbon. The apparatus can further comprise a housing circumscribing a downstream portion of the draw stack and the outlet of the interior area. The housing can define an exterior area positioned outside of the wall of the draw stack and between the downstream portion of the draw stack and the housing. The housing can comprise a vent configured to regulate gas flow through the vent from the exterior area to a location outside of the housing and outside of the draw stack.

In some embodiments, the vent can be adjustable to adjust a gas flow through the vent.

In some embodiments, the apparatus can further comprise a baffle configured to direct a first quantity of an input gas flow through the outlet and into the interior area and a second quantity of the input gas flow into the exterior area.

In some embodiments, methods of regulating an input gas flow can comprise directing a first quantity of the input gas flow through the outlet and into the interior area. The method can further comprise flowing the first quantity of the input gas flow through the interior area of the draw stack in a direction from the outlet towards the inlet. The method can further comprise directing a second quantity of the input gas flow into the exterior area. The method can further comprise flowing the second quantity of the input gas flow through the vent from the exterior area.

In some embodiments, the method can further comprise adjusting the vent to adjust the flow rate of the second quantity of the input gas flow through the vent.

In some embodiments, the method can further comprise cooling the downstream portion of the draw stack by transferring heat from the downstream portion of the draw stack to the second quantity of the input gas flow flowing through the exterior area.

In some embodiments, a baffle can direct the first quantity of the input gas through the outlet and further direct the second quantity of the input gas flow into the exterior area.

In some embodiments, a draw stack for forming a glass ribbon can comprise a wall circumscribing an interior area comprising an inlet, and an outlet located downstream from the inlet. The apparatus can further comprise at least one pull stage within the interior area. Each pull stage of the at least one pull stage can comprise a first pair of rollers configured to grip a first outer edge of the glass ribbon and a second pair of pull rollers configured to grip a second outer edge of the glass ribbon. The apparatus can further comprise a first gate mounted relative to the wall for movement in a first extension direction relative to the wall. The first gate can comprise a first end edge comprising an outer surface of a first central edge plate laterally disposed between a first lateral edge and a second lateral edge. The outer surface of the first central edge plate can protrude in the first extension direction from the first lateral edge by a first distance. The outer surface of the first central edge plate can protrude in the first extension direction from the second lateral edge by a second distance. The first gate can further comprise a first row of conduits disposed within an interior chamber of the first gate. An outlet of each conduit of the first row of conduits can face an inner surface of the first central edge plate. The apparatus can further comprise a second gate mounted relative to the wall for movement in a second extension direction relative to the wall. The second gate can comprise a second end edge comprising an outer surface of a second central edge plate laterally disposed between a third lateral edge and a fourth lateral edge. The outer surface of the second central edge plate can protrude in the second extension direction from the third lateral edge by a third distance. The outer surface of the second central edge plate can protrude in the second extension direction from the fourth lateral edge by a fourth distance. The second gate can further comprise a second row of conduits disposed within an interior chamber of the second gate. An outlet of each conduit of the second row of conduits can face an inner surface of the second central edge plate. A width of the inlet can be defined between the outer surface of the first central edge plate and the outer surface of the second central edge plate.

In some embodiments, a distance in the first extension direction between the first lateral edge and the third lateral edge can be from about two times the width of the inlet to about ten times the width of the inlet.

In some embodiments, a distance in the first extension direction between the second lateral edge and the fourth lateral edge can be from about two times the width of the inlet to about ten times the width of the inlet.

In some embodiments, methods of regulating a temperature of a glass ribbon with the draw stack can comprise cooling a first outer edge of the glass ribbon by radiating heat through a first lateral space between the first lateral edge and the third lateral edge. The method can further comprise cooling a second outer edge of the glass ribbon by radiating heat through a second lateral space between the second lateral edge and the fourth lateral edge.

In some embodiments, the glass ribbon can travel within the interior area in a travel direction from the inlet towards the outlet while the first outer edge and the second outer edge passes between the outer surface of the first central edge plate and the outer surface of the second central edge plate.

In some embodiments, the method can further comprise cooling a width of the glass ribbon positioned between the outer surface of the first central edge plate and the outer surface of the second central edge plate by radiating heat from the width of the glass ribbon to the first central edge plate and the second central edge plate.

In some embodiments, the methods can further comprise emitting gas from the outlet of at least one conduit of the first row of conduits to convect heat from the first central edge plate and emitting gas from the outlet of at least one conduit of the second row of conduits to convect heat from the second central edge plate.

In some embodiments, the method can comprise modifying a difference between flow rates of gas being admitted by at least two conduits of the first row of conduits to adjust a thickness profile across the width of the glass ribbon.

In some embodiments, the cooling the first outer edge can comprise radiating heat through the first lateral space to a first fluid cooled element and the cooling of the second outer edge comprises radiating heat through the second lateral space to a second fluid cooled element.

In some embodiments, the method can further comprise adjusting the width of the inlet such that a distance in the first extension direction between the first lateral edge and the third lateral edge is from about two times the width of the inlet to about ten times the width of the inlet.

In some embodiments, the method can comprise adjusting the width of the inlet provides a distance in the first extension direction between the second lateral edge and the fourth lateral that is from about two times the width of the inlet to about ten times the width of the inlet.

Additional embodiments disclosed herein will be set forth in the detailed description that follows. It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

BRIEF DESCRIPTION OF THE DRAWINGS

These and other embodiments are better understood when the following detailed description is read with reference to the accompanying drawings, in which.

DETAILED DESCRIPTION

Figure 1:
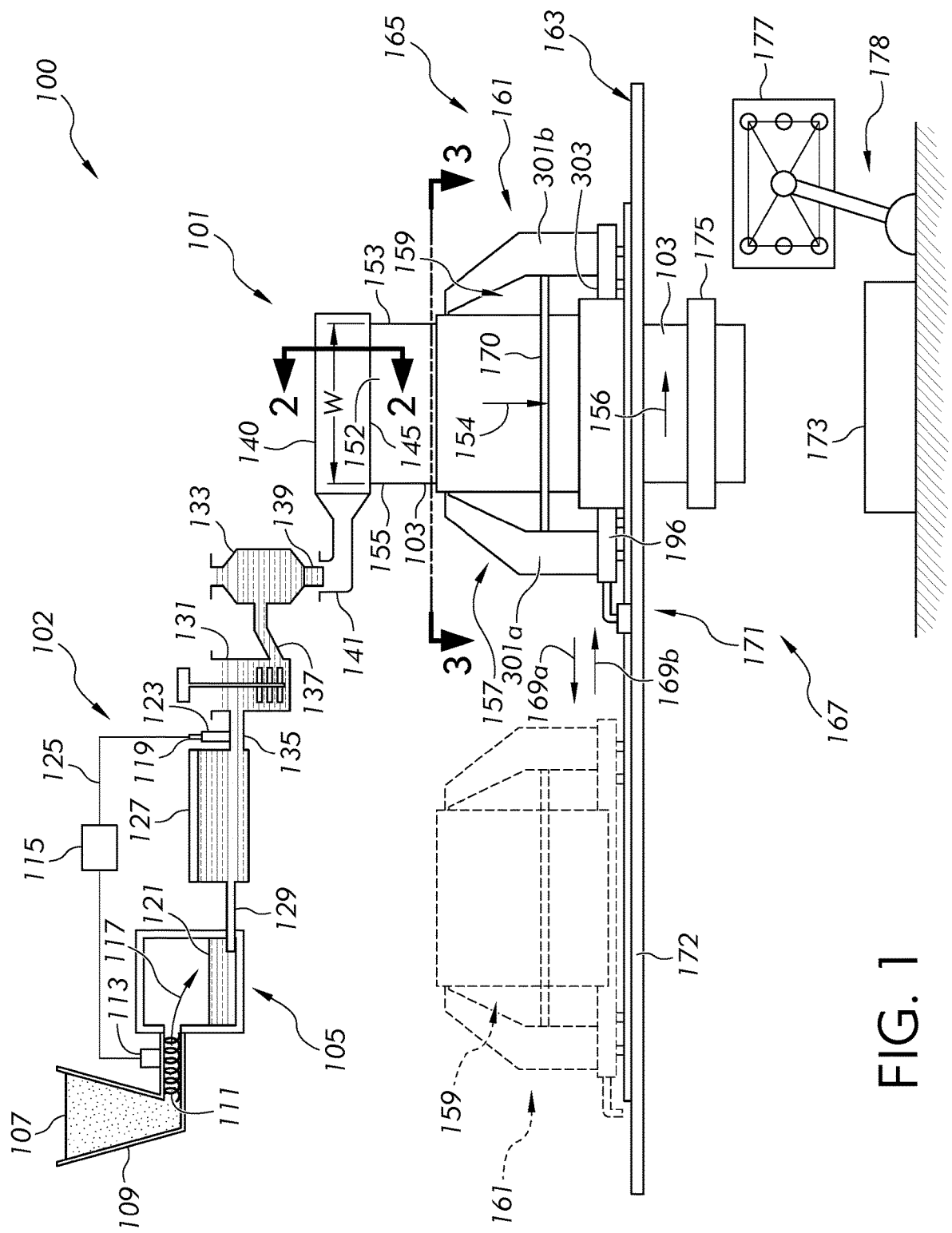
FIG. 1 schematically illustrates some exemplary embodiments of apparatus for forming a glass ribbon.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to an apparatus for forming a glass ribbon (hereinafter a "glass forming apparatus"). In some embodiments, the glass forming apparatus can comprise a forming device for producing a glass ribbon from a quantity of molten glass-forming material. Throughout the application, "molten glass-forming material" is considered molten material that can be cooled into a glass material. Throughout the application, "molten glass-forming ribbon" is considered a molten ribbon of material that can be cooled into a glass ribbon in a cooled elastic state. Unless otherwise indicated, throughout the application, "glass ribbon" can be considered a molten glass-forming ribbon, a cooled glass ribbon in a cooled elastic state, or a ribbon of material that is transitioning from a molten glass-forming ribbon into a cooled glass ribbon in an elastic state. A wide variety of forming devices may be provided as part of the glass forming apparatus such as a fusion-down-draw device, a press-roll device, slot-draw device or other device configured to produce a glass ribbon from a quantity of molten glass-forming material.

As discussed above, the glass forming apparatus can comprise a forming device. Alternatively, or in addition, the glass forming apparatus can comprise a processing apparatus to process the glass ribbon produced by the forming device. Thus, for purposes of this application, the glass forming apparatus can comprise the processing apparatus alone or in combination with the forming device. In some embodiments, the processing apparatus can be decoupled from the forming device. For example, the processing apparatus can be adjustable relative to the forming device and/or a support surface between an aligned orientation and an orientation that is not aligned. In the aligned orientation, glass ribbon produced by the forming device can be received by an interior area of a draw stack of the processing apparatus to process the glass ribbon. Alternatively, the processing apparatus can be adjusted relative to the forming device and/or support surface to the orientation that is not aligned where the processing apparatus is rendered accessible for maintenance, repairs and alterations. When the processing apparatus is in not aligned, in some embodiments, glass ribbon still being produced by the forming device may not received by the processing apparatus but may be deposited in a cullet for disposal.

In some embodiments, the processing apparatus can comprise a draw stack comprising an upper transition region with a pair of adjustable gates. The adjustable gates can each be moved toward and/or away from a flow path along which the glass ribbon enters the draw stack to customize cooling of the glass ribbon. In some embodiments, the gates can be configured to provide cooling to the glass ribbon traveling between the gates. In further embodiments, the cooling along the end edge can vary along a length of the end edge to provide a desired cooling profile to modify the thickness profile along the width of the glass ribbon passing between the end edges of the adjustable gates. The pair of adjustable gates can also provide enlarged lateral spaces to allow radiative cooling of the outer edges of the glass ribbon.

In some embodiments, a housing may be provided to circumscribe a downstream portion of the draw stack and the outlet of the interior area. In some embodiments, a baffle may be provided to direct a first quantity of the input gas flow through the outlet of the interior area of the housing and direct a second quantity of the input gas flow into an exterior area. These embodiments can help control the cooling provided by input air flowing into the interior area of the draw stack and can also help cool an outer surface of the draw stack with the air flowing into the exterior area.

Methods and apparatus for manufacturing glass will now be described by way of exemplary embodiments for forming a glass ribbon from a quantity of molten glass-forming material. As schematically illustrated in FIG. 1, in some embodiments, an exemplary glass manufacturing apparatus 100 can include a glass melting and delivery apparatus 102 and a glass forming apparatus 101 including a forming device 140 designed to produce a glass ribbon 103 from a quantity of molten glass-forming material 121. In some embodiments, the glass ribbon 103 can include a central portion 152 disposed between a first outer edge 153 and a second outer edge 155 opposite the first outer edge 153. The first outer edge 153 and second outer edge 155 each extends in a travel direction 154 of the glass ribbon 103 and are separated by a width "W" that extends in a width direction 156 that is perpendicular to the travel direction 154. The travel direction 154 can comprise a direction along which the glass ribbon 103 can be drawn from the forming device 140.

In some embodiments, the glass melting and delivery apparatus 102 can include a melting vessel 105 oriented to receive batch material 107 from a storage bin 109. The batch material 107 can be introduced by a batch delivery device 111 powered by a motor 113. In some embodiments, an optional controller 115 can be operated to activate the motor 113 to introduce a desired amount of batch material 107 into the melting vessel 105, as indicated by arrow 117. The melting vessel 105 can heat the batch material 107 to provide molten glass-forming material 121. In some embodiments, a melt probe 119 can be employed to measure a level of molten glass-forming material 121 within a standpipe 123 and communicate the measured information to the controller 115 by way of a communication line 125.

Additionally, in some embodiments, the glass melting and delivery apparatus 102 can include a first conditioning station including a fining vessel 127 located downstream from the melting vessel 105 and coupled to the melting vessel 105 by way of a first connecting conduit 129. In some embodiments, molten glass-forming material 121 can be gravity fed from the melting vessel 105 to the fining vessel 127 by way of the first connecting conduit 129. For example, in some embodiments, gravity can drive the molten glass-forming material 121 through an interior pathway of the first connecting conduit 129 from the melting vessel 105 to the fining vessel 127. Additionally, in some embodiments, bubbles can be removed from the molten glass-forming material 121 within the fining vessel 127 by various techniques.

In some embodiments, the glass melting and delivery apparatus 102 can further include a second conditioning station including a mixing chamber 131 that can be located downstream from the fining vessel 127. The mixing chamber 131 can be employed to provide a homogenous composition of molten glass-forming material 121, thereby reducing or eliminating inhomogeneity that may otherwise exist within the molten glass-forming material 121 exiting the fining vessel 127. As shown, the fining vessel 127 can be coupled to the mixing chamber 131 by way of a second connecting conduit 135. In some embodiments, molten glass-forming material 121 can be gravity fed from the fining vessel 127 to the mixing chamber 131 by way of the second connecting conduit 135. For example, in some embodiments, gravity can drive the molten glass-forming material 121 through an interior pathway of the second connecting conduit 135 from the fining vessel 127 to the mixing chamber 131.

Additionally, in some embodiments, the glass melting and delivery apparatus 102 can include a third conditioning station including a delivery vessel 133 that can be located downstream from the mixing chamber 131. In some embodiments, the delivery vessel 133 can condition the molten glass-forming material 121 to be fed into an inlet conduit 141. For example, the delivery vessel 133 can function as an accumulator and/or flow controller to adjust and provide a consistent flow of molten glass-forming material 121 to the inlet conduit 141. As shown, the mixing chamber 131 can be coupled to the delivery vessel 133 by way of a third connecting conduit 137. In some embodiments, molten glass-forming material 121 can be gravity fed from the mixing chamber 131 to the delivery vessel 133 by way of the third connecting conduit 137. For example, in some embodiments, gravity can drive the molten glass-forming material 121 through an interior pathway of the third connecting conduit 137 from the mixing chamber 131 to the delivery vessel 133. As further illustrated, in some embodiments, a delivery pipe 139 can be positioned to deliver molten glass-forming material 121 to glass forming apparatus 101, for example the inlet conduit 141 of the forming device 140.

The glass forming apparatus 101 can comprise various embodiments of the forming device 140 in accordance with features of the disclosure including, but not limited to a fusion forming device with a wedge for fusion drawing the glass ribbon, a forming device with a slot to slot draw the glass ribbon, or a forming device provided with press rolls to press roll the glass ribbon from the forming device. By way of illustration, the forming device 140 shown and disclosed herein can be provided to fusion draw the molten glass-forming material 121 off a bottom edge, defined as a root 145, of a forming wedge 201 (see FIG. 2) to produce a ribbon of molten glass-forming material that can be drawn and cooled into the glass ribbon 103. For example, in some embodiments, the molten glass-forming material 121 can be delivered from the inlet conduit 141 to the forming device 140. The molten glass-forming material 121 can then be formed into the glass ribbon 103 based at least in part on the structure of the forming device 140. For example, as shown, the molten glass-forming material 121 can be drawn as a ribbon of molten glass-forming material off the bottom edge (e.g., root 145) of the forming device 140 along a glass ribbon travel path 204 extending in the travel direction 154.

For purposes of this application, the glass ribbon travel path 204 is the path at least partially defined by the glass forming apparatus 101 (when in line with the glass forming apparatus described herein) wherein the glass ribbon travels through the glass ribbon travel path 204. Thus, for example, the glass ribbon travel path 204 can comprise dimensions of the glass ribbon 103 traveling along and through the glass ribbon travel path 204. In some embodiments, the first outer edge 153 of the glass ribbon 103 can be coincident with the corresponding first outer edge of the glass ribbon travel path 204, and the second outer edge 155 of the glass ribbon 103 can be coincident with the corresponding second outer edge of the glass ribbon travel path 204. The glass ribbon travel path 204 can comprise a width extending in a width direction that can comprise the width "W" of the glass ribbon 103 extending in the width direction 156 of the glass ribbon 103. The width direction of the width of the glass ribbon travel path 204 can extend perpendicular to the travel direction 154 from the first outer edge of the glass ribbon travel path 204 to the second outer edge of the glass ribbon travel path 204. In some embodiments, the width "W" of the glass ribbon 103 can be substantially equal to the width of the glass ribbon travel path 204.

In some embodiments, the width "W" of the glass ribbon 103 can be greater than or equal to about 20 mm, such as greater than or equal to about 50 mm, such as greater than or equal to about 100 mm, such as greater than or equal to about 500 mm, such as greater than or equal to about 1000 mm, such as greater than or equal to about 2000 mm, such as greater than or equal to about 3000 mm, such as greater than or equal to about 4000 mm, although other widths less than or greater than the widths mentioned above can be provided in further embodiments. For example, in some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Figure 2:
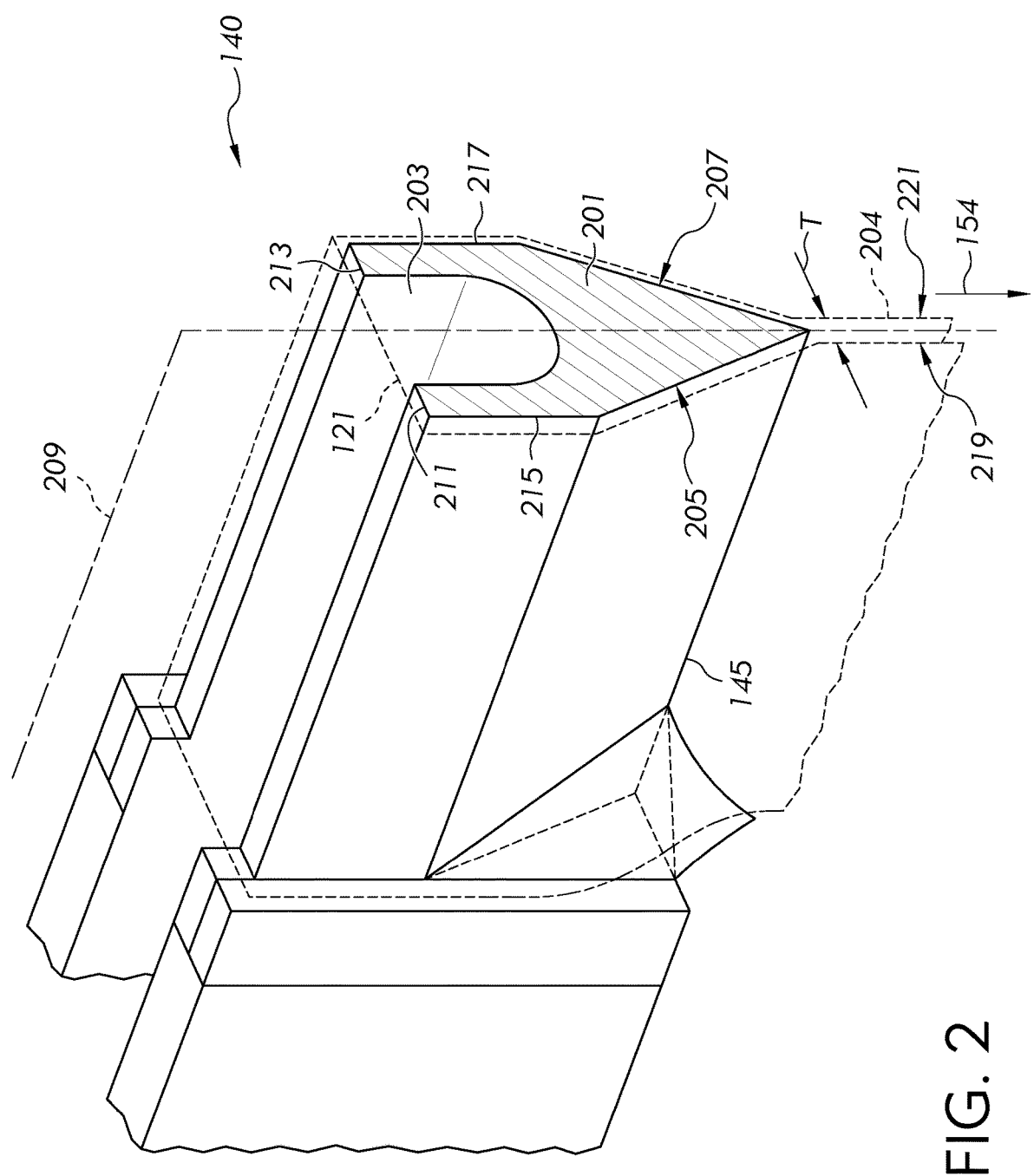
FIG. 2 illustrates a schematic cross-sectional view of a forming device of the apparatus taken along line 2-2 of FIG. 1.

As shown in FIG. 2, the forming device 140 can include a trough 203 oriented to receive the molten glass-forming material 121 from the inlet conduit 141. For illustrative purposes, the molten glass-forming material 121 is shown in broken lines in FIG. 2 for clarity. The forming device 140 can further include the forming wedge 201 including a pair of downwardly inclined converging surface portions 205, 207 extending between opposed ends of the forming wedge 201. The pair of downwardly inclined converging surface portions 205, 207 of the forming wedge 201 can converge along the travel direction 154 to intersect along the root 145 of the forming device 140. A draw plane 209 of the glass manufacturing apparatus 100 can extend through the root 145 along the travel direction 154. In some embodiments, the glass ribbon 103 can be drawn in the travel direction 154 along the draw plane 209. As shown, the draw plane 209 can bisect the forming wedge 201 through the root 145 although, in some embodiments, the draw plane 209 can extend at other orientations relative to the root 145.

The molten glass-forming material 121 can flow into and along the trough 203 of the forming device 140. The molten glass-forming material 121 can then overflow from the trough 203 by simultaneously flowing over corresponding weirs 211, 213 and downward over the outer surfaces 215, 217 of the corresponding weirs 211, 213. Respective streams of molten glass-forming material 121 can then flow along the downwardly inclined converging surface portions 205, 207 of the forming wedge 201 to be drawn off the root 145 of the forming device 140, where the flows converge and fuse into the ribbon of molten glass-forming material. The ribbon of molten glass-forming material can then be drawn off the root 145 in the draw plane 209 along the travel direction 154 and cooled into the glass ribbon 103.

Referring once again to FIG. 1, the glass forming apparatus 101 can also include a glass processing apparatus 157. When the glass processing apparatus 157 is aligned with the forming device 140, the glass ribbon 103 formed with the forming device 140 can be processed by the glass processing apparatus 157. In some embodiments, the glass processing apparatus 157 engages the first outer edge 153 and the second outer edge 155 of the glass ribbon 103 to draw the glass ribbon 103, and accordingly, the molten glass-forming material 121 from the root 145 of the forming device 140.

The glass ribbon 103 comprises a first major surface 219 and a second major surface 221 facing opposite directions and defining a thickness "T" (e.g., average thickness) at the central portion 152 of the glass ribbon 103. In some embodiments, the thickness "T" of the glass ribbon 103 can be less than or equal to about 2 millimeters (mm), less than or equal to about 1 mm, less than or equal to about 0.5 mm, for example, less than or equal to about 300 micrometers (µm), less than or equal to about 200 µm, or less than or equal to about 100 µm, although other thicknesses may be provided in further embodiments. For example, in some embodiments, the thickness "T" of the glass ribbon 103 can be from about 50 µm to about 750 µm, from about 100 µm to about 700 µm, from about 200 µm to about 600 µm, from about 300 µm to about 500 µm, from about 50 µm to about 500 µm, from about 50 µm to about 700 µm, from about 50 µm to about 600 µm, from about 50 µm to about 500 µm, from about 50 µm to about 400 µm, from about 50 µm to about 300 µm, from about 50 µm to about 200 µm, from about 50 µm to about 100 µm, including all ranges and subranges of thicknesses therebetween. In addition, the glass ribbon 103 can include a variety of compositions including, but not limited to, soda-lime glass, borosilicate glass, alumino-borosilicate glass, alkali-containing glass, or alkali-free glass. Furthermore, the glass ribbon can comprise glass-ceramic in further embodiments.

Figure 3:
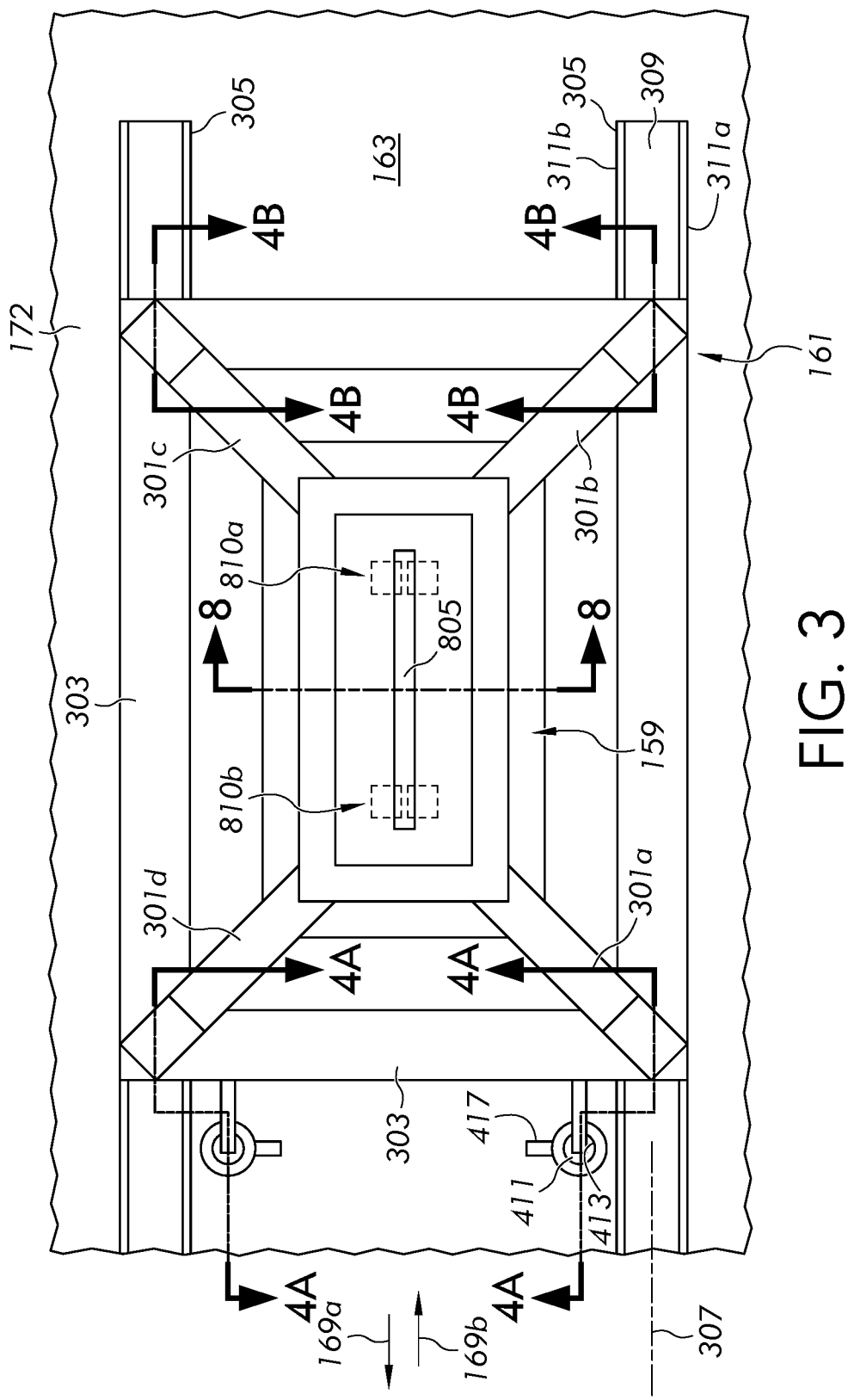
FIG. 3 illustrates a schematic top view of the apparatus along line 3-3 of FIG. 1.
Figure 8:
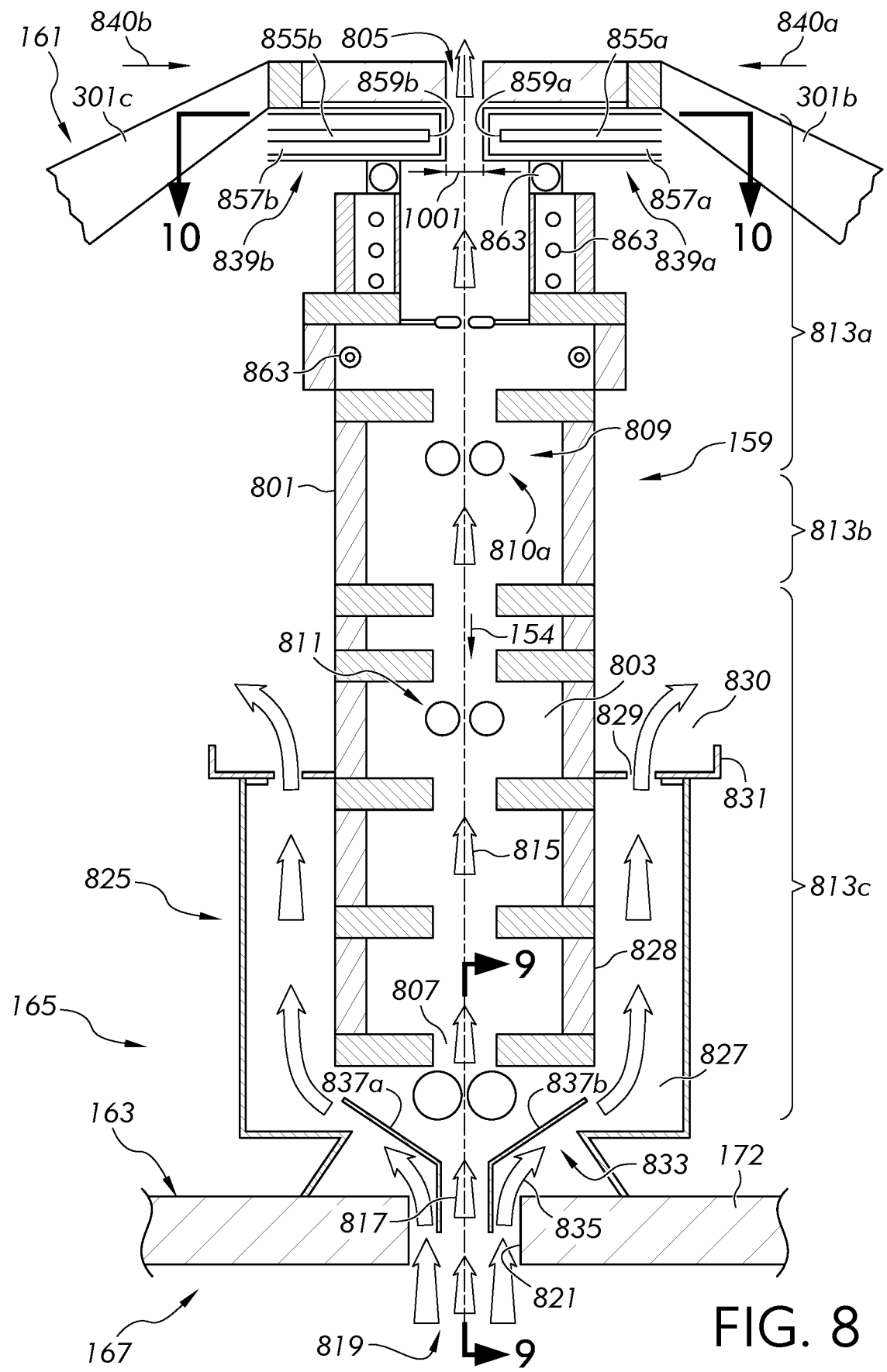
FIG. 8 illustrates a schematic sectional view of the draw stack along line 8-8 of FIG. 3.
Figure 9:
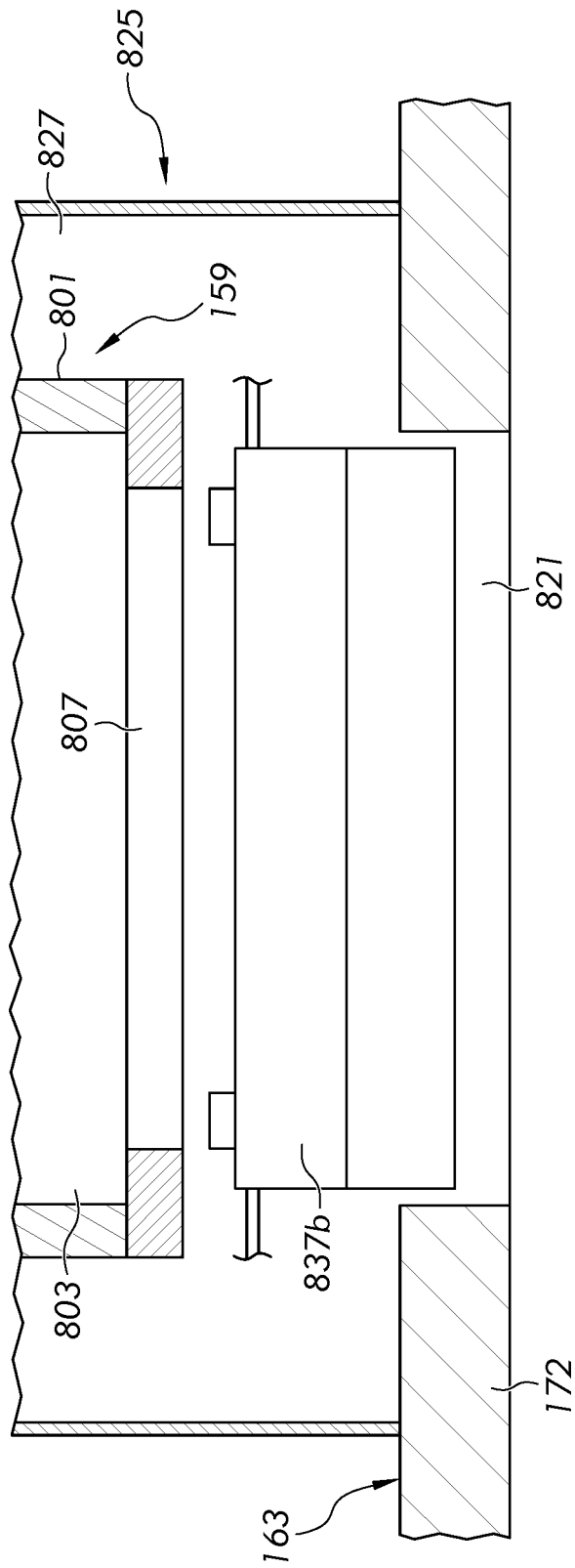
FIG. 9 illustrates a schematic sectional view of the draw stack along line 9-9 of FIG. 8.

As mentioned previously, the glass forming apparatus 101 can comprise the glass processing apparatus 157 alone or in combination with the forming device 140. As shown in FIGS. 1 and 3, the glass processing apparatus 157 can comprise a draw stack 159. As shown in FIGS. 8 and 9, the draw stack can comprise a wall 801 circumscribing an interior area 803 comprising an inlet 805, and an outlet 807 located downstream from the inlet 805 in the travel direction 154. The draw stack 159 can further comprise at least one pull stage 809, 811 within the interior area 803, each pull stage of the at least one pull stage 809, 811 can comprise a first pair of pull rollers 810a (see FIGS. 3 and 8) configured to grip the first outer edge 153 of the glass ribbon 103 and a second pair of pull rollers 810b (see FIG. 3) configured to grip the second outer edge 155 of the glass ribbon 103. While FIG. 8 illustrates the at least one pull stage 809, 811 comprising a first pull stage 809 and a second pull stage 811, in further embodiments, the at least one pull stage may include a single pull stage or more than two pull stages.

As shown in FIGS. 1 and 3, a support apparatus 161 can be provided to support the draw stack 159 on a support surface 163. In some embodiments, the support surface 163 can comprise the floor of an upper room 165 positioned above a lower room 167. In some embodiments, the support apparatus 161 can be configured to movably support the draw stack 159 to move laterally in directions 169a, 169b between a position wherein the draw stack 159 is aligned with the forming device 140 (as shown in solid lines in FIG. 1) to a position where the draw stack 159 is not aligned with the forming device 140 (as shown in broken lines in FIG. 1).

As shown in FIG. 3, in some embodiments, the support apparatus 161 can comprise support arms 301a, 301b, 301c, 301d. As shown, an upper portion of each support arm that can be mounted, for example, to four upper corner portions of the draw stack 159. As shown in FIG. 1, an optional platform 170 (not shown in FIG. 3) can be provided and mounted between two of the support arms to allow a user to access upper portions of the draw stack 159. Furthermore, in some embodiments, the lower portion of each support arm can be mounted, for example, to a base 303. While four support arms are shown, in further embodiments less than four support arms or more than four support arms may be provided. The support apparatus 161 can further comprise a support member comprising an end portion with a mobility device designed to reduce the effort to move the stack between the aligned position (shown in solid lines in FIG. 1) to the position out of alignment (shown in broken lines in FIG. 1). FIGS. 4-7 show embodiments of a mobility device taken along lines 4A-4A of FIG. 3 where mobility devices taken at line 4B-4B of FIG. 3 may be identical or may not include a lateral lock as shown in FIGS. 4-7. In some embodiments, as shown, the mobility device can comprise a wheel 401 at an end portion 403 of a support member 405. In some embodiments, four wheels may be provided at each section 4A-4A, 4B-4B wherein the support apparatus 161 may permit the draw stack 159 to be pushed or pulled with reduced friction as the wheels 401 rotate. Other alternative rotating mobility devices may be provided such as cylindrical rollers, rotating spherical bearings. In further embodiments, nonrotating mobility devices may be provided. For example, rather than the wheels 401, a self-lubricating material (e.g., Teflon) may be used to reduce the friction between the end portion of the support member and the support surface. In further embodiments, as shown, an end portion 407 of support member 409 may comprise an air bearing designed to produce a gas cushion 701 (see FIG. 7) to levitate the support apparatus 161 together with the draw stack 159. In some embodiments, the wheels 401 can be provided as an alternative support member to the air bearing or in addition to the air bearing. If provided in addition, the mode of operation can be selected or the wheels 401 can be provided as a back-up to the air bearing.

Figure 5:
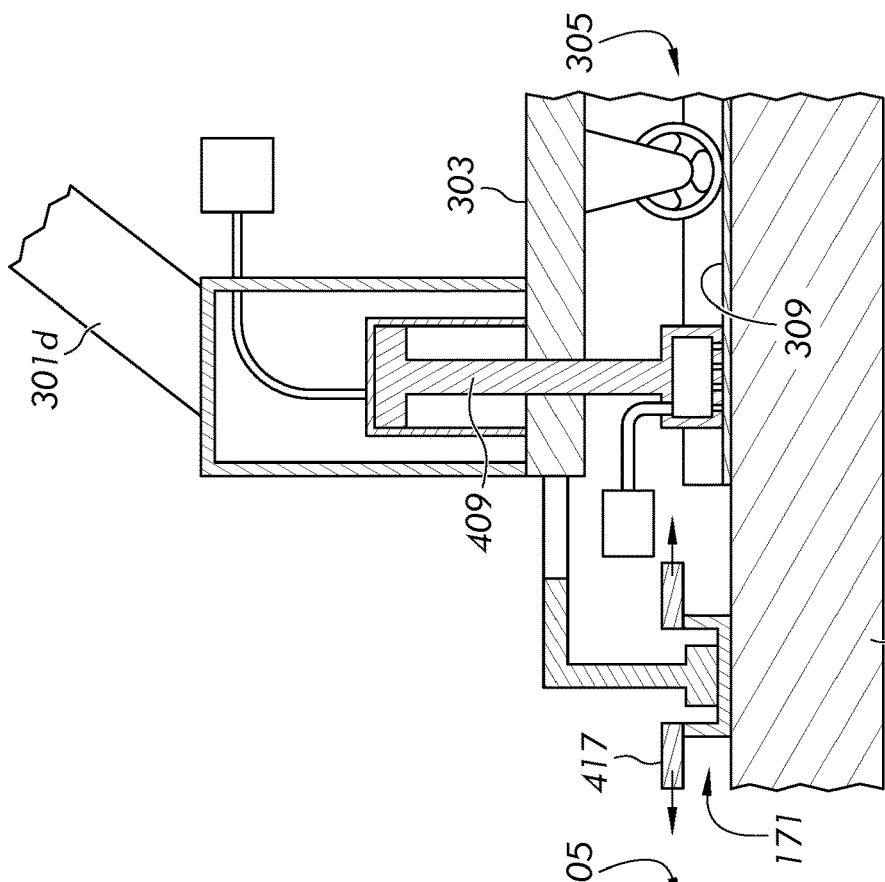
FIG. 5 illustrates a schematic sectional view of the apparatus along lines 4A-4A of FIG. 3 with the draw stack of FIGS. 1 and 3 unlocked from a vertical movement while remaining locked from a horizontal movement relative to a support surface.
Figure 4:
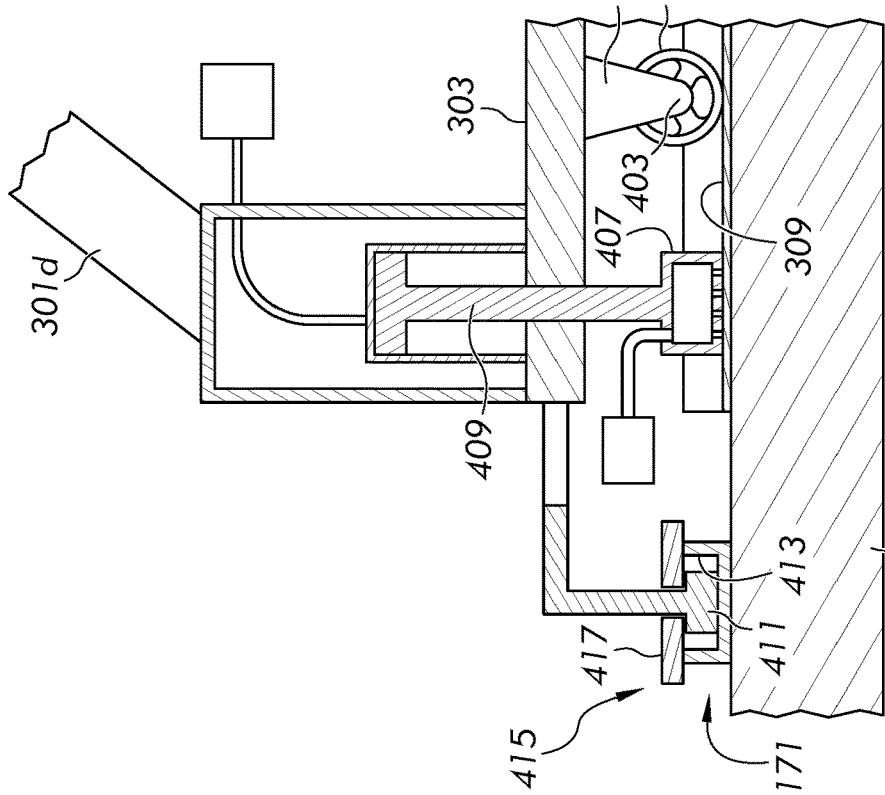
FIG. 4 illustrates a schematic sectional view of the apparatus along lines 4A-4A of FIG. 3 with a draw stack of FIGS. 1 and 3 locked from a vertical movement and a horizontal movement relative to a support surface.
Figure 7:
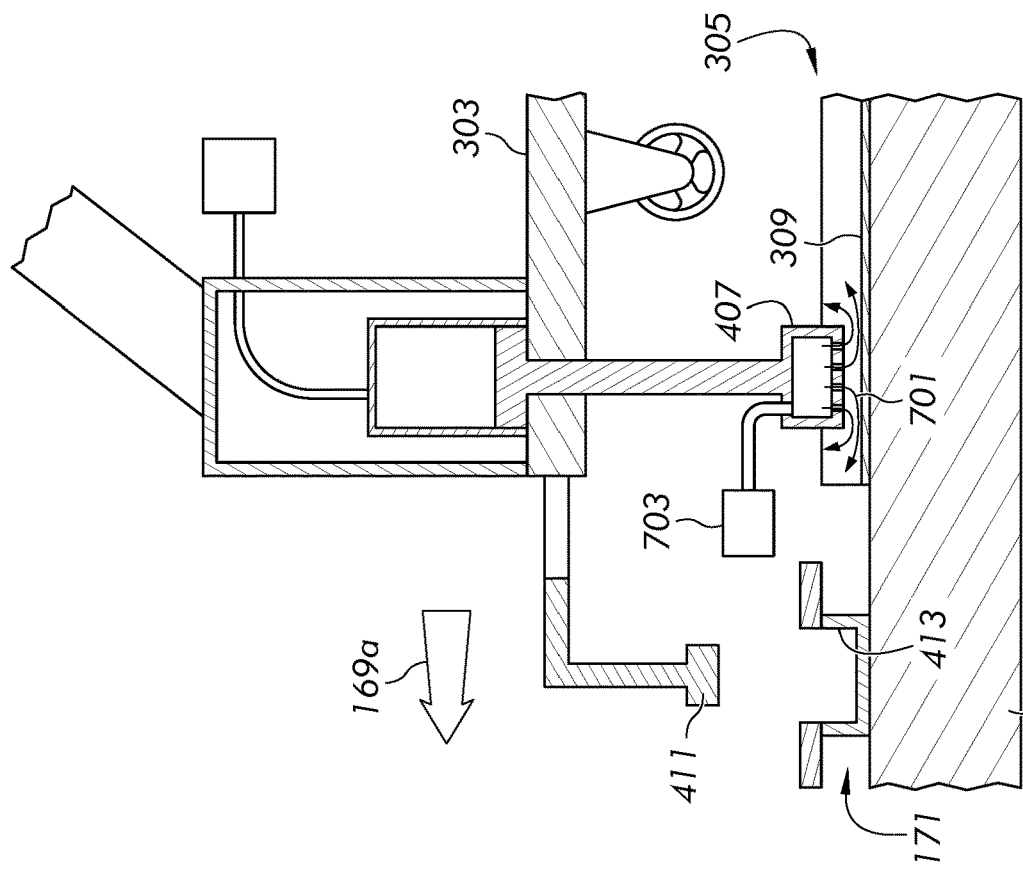
FIG. 7 illustrates a schematic sectional view of the apparatus along lines 4A-4A of FIG. 3 with the draw stack of FIGS. 1 and 3 with the draw stack being lifted as in FIG. 6 while also levitating the draw stack with a cushion of gas.
Figure 6:
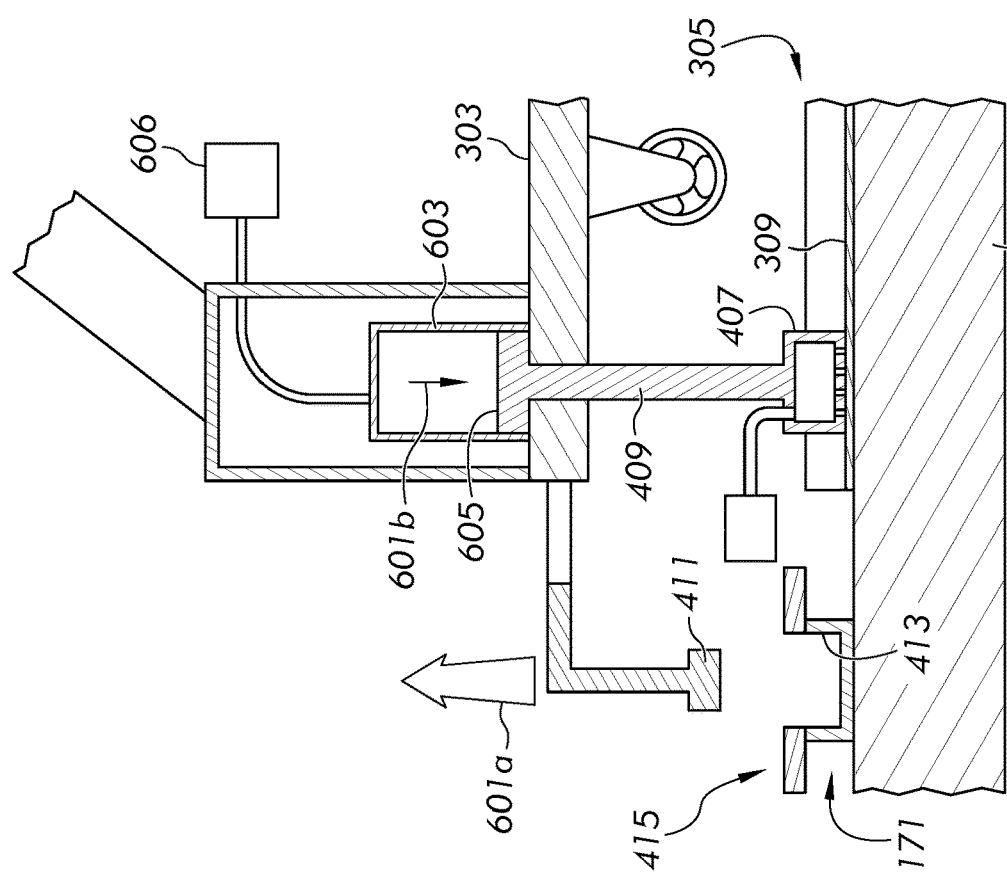
FIG. 6 illustrates a schematic sectional view of the apparatus along lines 4A-4A of FIG. 3 with the draw stack of FIGS. 1 and 3 with the draw stack being lifted in a vertically upward direction to horizontally unlock the draw stack.

In some embodiments, the support apparatus 161 may comprise a lateral lock 171 designed to inhibit motion in the horizontal directions 169a, 169b in FIG. 1. Referring to FIG. 4, in some embodiments, the lateral lock 171 can comprise a protrusion 411 and a recess 413 configured to receive the protrusion 411. The recess 413 can be provided as part of a bracket that can be fixedly mounted to the support surface 163. As shown in FIGS. 4-5 when the protrusion 411 is received in the recess 413, the lateral lock 171 inhibits motion in the lateral directions. An optional latch device 415 that may include laterally moving latch members 417 may be provided to help prevent inadvertent removal of the protrusion 411 from the recess 413 in the locked orientation. As shown in FIGS. 6-7, the protrusion 411 can be removed from the recess 413 to unlock the support apparatus 161 and therefore permit lateral movement of the support apparatus 161 together with the draw stack 159 in horizontal directions 169a, 169b.

Different embodiments of the lateral lock may be provided to allow the protrusion 411 to be selectively received by the recess 413 to laterally lock the support apparatus 161 or removed from the recess 413 to unlock the support apparatus 161 for movement in the horizontal direction 169a. For example, the protrusion may be movable relative to the base 303. For example, a crank may be provided to move the protrusion in and out of the recess 413 as desired. Alternatively, as shown in FIGS. 6-7, the entire base 303, support arms 301a, 301b, 301c, 301d and draw stack 159 may be lifted together with the protrusion 411 to lift the protrusion out of the recess 413. In the illustrated embodiment, the support member 409 may be moved from a retracted position (see FIGS. 4-5) relative to the base 303 to an extended position (see FIG. 6-7) to increase an elevation of the draw stack 159 together with removing the protrusion 411 out of the recess 413 to laterally unlock the support apparatus 161. The support member 409 can also be moved from the extended position (see FIGS. 6-7) to the retracted position (see FIGS. 4-5) to reduce the elevation of the draw stack 159 together with inserting the protrusion 411 within the recess 413 to laterally lock the support apparatus 161.

In some embodiments, as shown in FIGS. 3-7, a track 305 may be provided to receive the end portions of the support member to define a lateral travel path 307 of the support apparatus 161 and draw stack 159. The track 305 can provide accurate alignment when moving the draw stack 159 back into alignment with the forming device 140 as shown in FIG. 1. As shown, in some embodiments, the track 305 can comprise a channel with a lower plate 309 for bearing the load from the support member and side flanges 311a, 311b for helping maintain proper alignment as the support apparatus 161 moves laterally. Furthermore, the channel arrangement can help trap air from exiting when forming the gas cushion 701 to provide a more stable air cushion that may not only levitate the end portion 407 but also self align the end portion 407 within the channel by way of the air cushion also forming along lateral portions of the end portion 407 between the lateral portions of the end portion and the side flanges 311a, 311b.

Methods of processing glass ribbon will now be described with initial reference to FIGS. 1 and 2. A method can comprise forming glass ribbon 103 from one of the methods discussed above. For example, as shown in FIG. 2, the glass ribbon 103 may be drawn from the root 145 of the forming wedge 201. As shown in FIG. 1, the draw stack 159 can be aligned with the forming wedge 201 such that the glass ribbon 103 travels along the glass ribbon travel path 204 and through the inlet 805 of the interior area 803 of the draw stack 159. The first outer edge 153 of the glass ribbon 103 can be gripped between the first pair of pull rollers 810a of the at least one pull stage 809, 811 and the second outer edge 155 of the glass ribbon 103 can be gripped between the second pair of pull rollers 810b of the at least one pull stage 809, 811. The glass ribbon can continue to be drawn with the at least one pull stages in the travel direction 154 that extends in a direction from the inlet 805 toward the outlet 807 of the draw stack 159. Thus, the moving glass ribbon 103 can travel in a downward direction (e.g., in a direction of gravity) through the interior area 803 while the draw stack 159 is supported on the support surface 163 by way of the support apparatus 161. The moving glass ribbon 103 can also travel in the downward direction through the interior area 803 while the inlet 805 of the interior area 803 is aligned with the forming device 140 to receive the glass ribbon 103 traveling along the glass ribbon travel path 204 from the forming device 140. The glass ribbon can then travel through an opening 821 (see FIG. 8) in the partition 172 such that the glass ribbon travels into the lower room 167 (see FIG. 1) that may comprise a clean room to help inhibit such as prevent dust or other debris from contaminating the surfaces of the glass ribbon 103. Once a sufficient length has been obtained, a glass separation apparatus 175 may separate the ribbon along the width "W" of the ribbon into a separated sheet of ribbon 177 that can be held and transported by a robot 178 to a storage container, conveyor other downstream processing station.

After a period of time, the draw stack 159 may need to be serviced. For example, heating elements, cooling elements, pull rollers or other components of the draw stack 159 may need to be serviced. In some embodiments, the draw stack 159 may be laterally moved in a horizontal direction 169a (e.g., perpendicular or another angle relative to gravity) relative to the support surface 163 such that the inlet 805 of the interior area 803 of the draw stack 159 is out of alignment with the forming device 140 such that the glass ribbon travel path 204 does not travel through the inlet 805 of the draw stack 159. Once out of alignment, the working components including the heating elements of the draw stack 159 can be powered down and the draw stack 159 can be serviced. While the draw stack 159 is out of alignment, glass ribbon 103 can continue to be fed in a vertically downward direction (e.g., the travel direction 154) without passing through the interior area 803 of the draw stack 159. Rather, the glass ribbon 103 can continue to be fed in the vertically downward direction into the opening 821 through the partition 172 (e.g., ceiling/floor) between the upper room 165 and the lower room 167 and into a cullet 173. In such a manner, the production of glass ribbon by the forming device 140 can continue uninterrupted that can reduce down time and costs associated with shutting down the entire glass production line for servicing the draw stack.

In some embodiments, prior to the moving the draw stack 159 in the horizontal direction 169a, the draw stack 159 can be horizontally unlocked. For instance, the lateral lock 171 can be engaged as shown in FIGS. 1 and 4-5. Then the protrusion 411 can be lifted out of the recess 413 to horizontally unlock the draw stack 159 to permit movement of the draw stack 159 in the horizontal direction 169a. To lift the protrusion 411 out of the recess 413, the protrusion may be moved vertically relative to the base 303. Alternatively, as shown in FIGS. 6-7, the draw stack 159, the base 303 and the protrusion 411 may be lifted together in a vertically upward direction 601a to horizontally unlock the draw stack 159. For example, an actuator 603 such as the illustrated hydraulic cylinder may be pressurized by a hydraulic source 606 to extend the piston 605 in direction 601b relative to the base 303 to extend the support member 409 and thereby lift the draw stack 159, the base 303 and the protrusion 411 together in the vertically upward direction 601a to horizontally unlock the draw stack 159. Once unlocked, the draw stack 159 can be moved in the horizontal direction 169a to bring the draw stack 159 out of alignment to the service location indicated by broken lines in FIG. 1. In some embodiment, prior to lifting, the latch device 415, if provided, may be unlatched to permit movement of the protrusion 411 out of the recess 413.

In some embodiments, as shown in FIG. 7, a pressurized gas source 703 may be activated to produce the gas cushion 701 to levitate the draw stack 159 and support apparatus 161 while the draw stack 159 is lifted with the support member 409 in the extended position relative to the base 303. The gas cushion 701 reduces the effort to move the support apparatus 161 together with the draw stack 159 in the horizontal direction 169a. The wheel 401 can be provided in other embodiments as an alternative or in addition to the support member 409. For example, as shown, the wheel 401 may be mounted by support member 405 to the base 303 wherein the wheel 401 is not configured to move vertically relative to the base 303. Alternatively, although not shown, the wheel 401 may be extended to lift the draw stack 159. In the illustrated embodiment, the wheel 401 can act as a backup mechanism to support the weight of the draw stack 159 when the support member 409 is retracted.

In some embodiments, the movement of the draw stack 159 in the direction 169a can be limited to travel along lateral travel path 307 by the track 305. For example, as shown, the end portion 407 of the support member 409 can be received within an interior area of the track defined by the lower plate 309 and side flanges 311a, 311b to guide the draw stack 159 to travel in the direction 169a. The draw stack 159 can then be serviced in the servicing position shown by broken lines in FIG. 1. Once complete, the draw stack 159 can then again be lifted by extending the support member 409 and the gas cushion 701 can be produced while the draw stack 159 is moved in the opposite direction 169b until the protrusion 411 is aligned with the recess 413 of the lateral lock 171. Once aligned with the recess 413, the draw stack 159 is aligned with the forming device 140. The pressurized gas source 703 can then be turned off or disengaged from the end portion 407 to eliminate the gas cushion 701. The support member 409 can then be retracted to lower the draw stack into the aligned and working position where the draw stack again receives the glass ribbon through the inlet 805 of the interior area 803. Once lowered, the protrusion 411 can be received in the recess 413 such that the lateral lock 171 laterally locks the draw stack 159 in the proper aligned orientation. In some embodiments, the latch device 415, if provided, can be engaged to vertically lock the protrusion 411 within the recess 413. The glass processing apparatus 157 can then be used to continue processing glass ribbon 103.

To help process the glass ribbon 103, the draw stack 159 can carefully control the temperature conditions of the glass ribbon being processed while passing through the interior area 803 of the draw stack 159. As shown in FIG. 8, the glass ribbon can pass through a visco-elastic zone 813a where the thickness of the glass ribbon 103 can be varied, the glass ribbon 103 can then travel in the travel direction 154 to the setting zone 813b where the glass ribbon transitions from the visco-elastic state to the cooled elastic state. The glass ribbon 103 can then continue traveling in the travel direction 154 until the glass ribbon 103 has cooled to the elastic state in elastic zone 813c. An interior air current 815 can travel upwardly due to the buoyancy of the gas since it is heated by the glass ribbon 103. The interior air current 815 can be replenished by a first quantity 817 of input gas 819 entering into the interior area 803. In some embodiments, the input gas 819 can pass upwardly through the opening 821 in the partition 172 between the upper room 165 and the lower room 167. In some embodiments, the lower room 167 can comprise a clean room where the input gas 819 (e.g., input air) from the clean room is filtered to prevent contaminants (e.g., dust, debris) from being drawn into the draw stack 159 that may contaminate the pristine surface of the glass ribbon 103.

In some embodiments, as shown in FIGS. 8-9, a housing 825 may be provided that circumscribes a downstream portion 828 of the draw stack 159 and the outlet 807 of the interior area 803. The housing 825 can define an exterior area 827 positioned outside of the wall 801 of the draw stack 159 and between the downstream portion 828 of the draw stack 159 and the housing 825. The housing 825 can comprise a vent 829 configured to regulate gas flow through the vent from the exterior area 827 to a location 830 outside of the housing 825 and outside of the draw stack 159. In some embodiments, the vent 829 can be adjustable to adjust a glass flow through the vent 829. For example, as shown a slide closure 831 may be provided to adjust the size of the opening of the vent 829 and thereby control the flow rate of the gas traveling through the vent.

In some embodiments, a baffle 833 can be provided to direct the first quantity 817 of input gas 819 to flow through the outlet 807 of the interior area 803 of the draw stack 159 and then into the interior area 803 to flow upwardly toward the inlet 805 of the interior area 803 due to the buoyancy of the gas being heated by the glass ribbon 103. The baffle 833 can also direct a second quantity 835 of the input gas 819 to flow into the exterior area 827. In some embodiments, the baffle can comprise a first portion 837a and second portion 837b that diverge from one another in the upward direction and each act to divide the input gas 819 into the first quantity 817 and the second quantity 835 of gas. In some embodiments, as shown, the first portion 837a and the second portion 837b may be symmetrically disposed about the glass ribbon travel path 204. A channel can be defined between corresponding lower portions of the first and second portions 837a, 837b that can be laterally aligned with the outlet 807 of the interior area 803. The upper portions can diverge to direct the second quantity 835 of the input gas 819 to the exterior area 827.

Methods of regulating the input gas 819 can comprise directing the first quantity 817 of the input gas 819 to flow through the outlet 807 and into the interior area 803 of the draw stack 159. The first quantity of the input gas 819 flowing within the interior area 803 can flow in the direction from the outlet 807 towards the inlet 805 of the interior area 803. The method can further comprise directing the second quantity 835 of the input gas 819 into the exterior area 827. The second quantity 835 of the input gas 819 can then flow through the vent 829 from the exterior area 827 to the location 830 outside of the exterior area 827. As shown, the baffle 833 can divide the input gas 819 into the first quantity 817 of the input gas 819 directed pass through the outlet 807 and the second quantity 835 of input gas 819 flowing into the exterior area 827. In some embodiments, the first and second portions 837a, 837b can be adjustable relative to one another to adjust the proportions of the division of the input gas 819. For example, the first and second portions 837a, 837b can be moved laterally closer together to reduce the first quantity 817 of input gas 819 passing into the interior area 803 while increasing the second quantity 835 of input gas 819 passing into the exterior area 827. In further examples, the first and second portions 837a, 837b can be moved laterally farther away form one another to increase the first quantity 817 of the input gas 819 passing into the interior area 803 while decreasing the second quantity 835 of input gas 819 passing into the exterior area 827. Adjusting the proportion of the input gas 819 passing as the first quantity 817 and the second quantity 835 can adjust the proportion of the input gas that cools the glass ribbon within the interior area 803. In some embodiments, the downstream portion 828 of the draw stack 159 can be cooled by transferring heat from the downstream portion 828 of the draw stack 159 to the second quantity 835 of the input gas flow flowing through the exterior area 827. The slide closures 831 of the vent 829 can also be adjusted to adjust the flow rate of the second quantity 835 of the input gas 819 flowing through the vent 829. For example, adjusting the slide closures 831 to reduce the size of the vent 829 will reduce the second quantity 835 of the input gas flowing through the exterior area 827 and out the vent 829 while increasing the first quantity 817 of the input gas 819 passing into the interior area 803. In another example, adjusting the slide closures 831 to increase the size of the vent 829 will increase the second quantity 835 of the input gas flowing through the exterior area 827 and out the vent 829 while decreasing the first quantity 817 of the input gas 819 passing into the interior area 803. Maximum cooling of the ribbon with the input gas 819 can be achieved by maximizing the amount of input gas 819 flowing into the interior area 803. Consequently, cooling of the glass ribbon 103 with the input gas 819 can be adjusted by a corresponding adjustment of the size of the vent 829 to proper size to achieve the optimal cooling with the input gas 819. Furthermore, the downstream portion 828 of the draw stack 159 may be cooled by the second quantity 835 of the input gas 819 flowing through the exterior area 827. Cooling of the downstream portion 828 of the draw stack 159 can enhance radiative heat transfer from the glass ribbon 103 to the downstream portion 828 of the draw stack 159. However, convective cooling provided by the first quantity 817 of the input gas 819 can provide greater cooling of the glass ribbon 103 than the cooling of the glass ribbon provided by cooling the downstream portion 828 of the draw stack 159 with the second quantity 835 of the input gas 819.

As shown in FIG. 8, the inlet 805 can be at least partially defined by a first gate 839a and a second gate 839b. In some embodiments, the first gate 839a can be similar or identical to the second gate 839b. Unless otherwise noted, features of one of the first gate and second gate described below can apply to the other of the first gate and the second gate.

Figure 11:
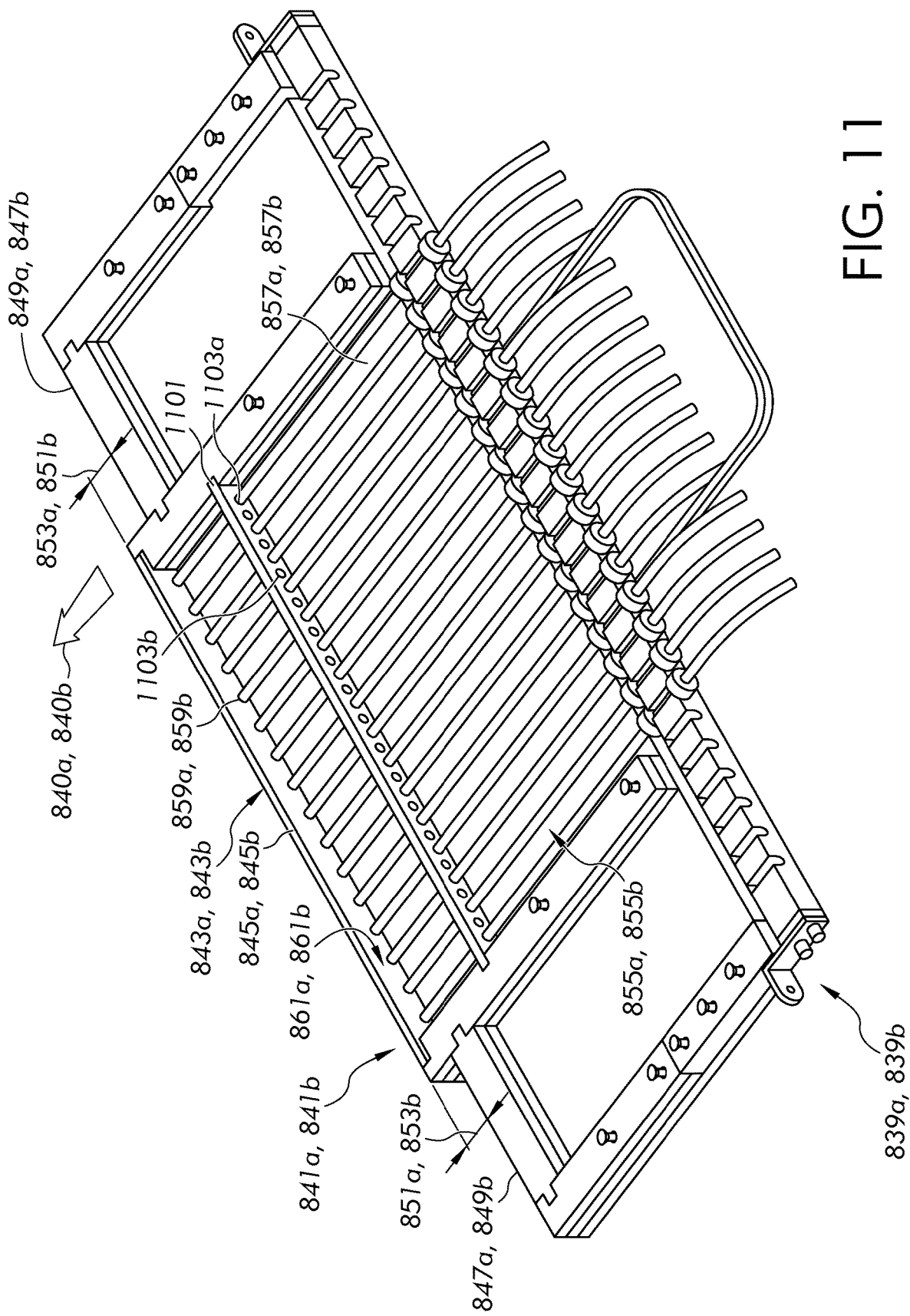
FIG. 11 illustrates a perspective view of interior portions of the first gate and the second gate of FIG. 10.

The first gate 839a can be mounted relative to the wall 801 for movement in a first extension direction 840a relative to the wall 801. As shown in FIG. 11, the first gate 839a can comprise a first end edge 841a comprising an outer surface 843a of a first central edge plate 845a laterally disposed between a first lateral edge 847a and a second lateral edge 849a. In some embodiments, the outer surface 843a of the first central edge plate 845a can protrude in the first extension direction 840a from the first lateral edge 847a by a first distance 851a. In some embodiments, the outer surface 843a of the first central edge plate 845a can protrude in the first extension direction 840a from the second lateral edge 849a by a second distance 853a. As shown, in some embodiments, the first distance 851a can be substantially equal to the second distance 853a although different distances may be provided in further embodiments. The first gate 839a can further comprise a first row of conduits 855a disposed within an interior chamber 857a of the first gate 839a. An outlet 859a of each conduit of the first row of conduits 855a can face and be spaced away from an inner surface 861a of the first central edge plate 845a.

The second gate 839b can be mounted relative to the wall 801 for movement in a second extension direction 840b relative to the wall 801. The second gate 839b can comprise a second end edge 841b comprising an outer surface 843b of a second central edge plate 845b laterally disposed between a third lateral edge 847b and a fourth lateral edge 849b. In some embodiments, the outer surface 843b of the second central edge plate 845b can protrude in the second extension direction 840b from the third lateral edge 847b by a third distance 851b. In further embodiments, the outer surface 843b of the second central edge plate 845b can protrude in the second extension direction 840b from the fourth lateral edge 849b by a fourth distance 853b. The second gate 839b can further comprise a second row of conduits 855b disposed within the interior chamber 857b of the second gate 839b. An outlet 859b of each conduit of the second row of conduits 855b can face and be spaced away from an inner surface 861b of the second central edge plate 845b.

Figure 10:
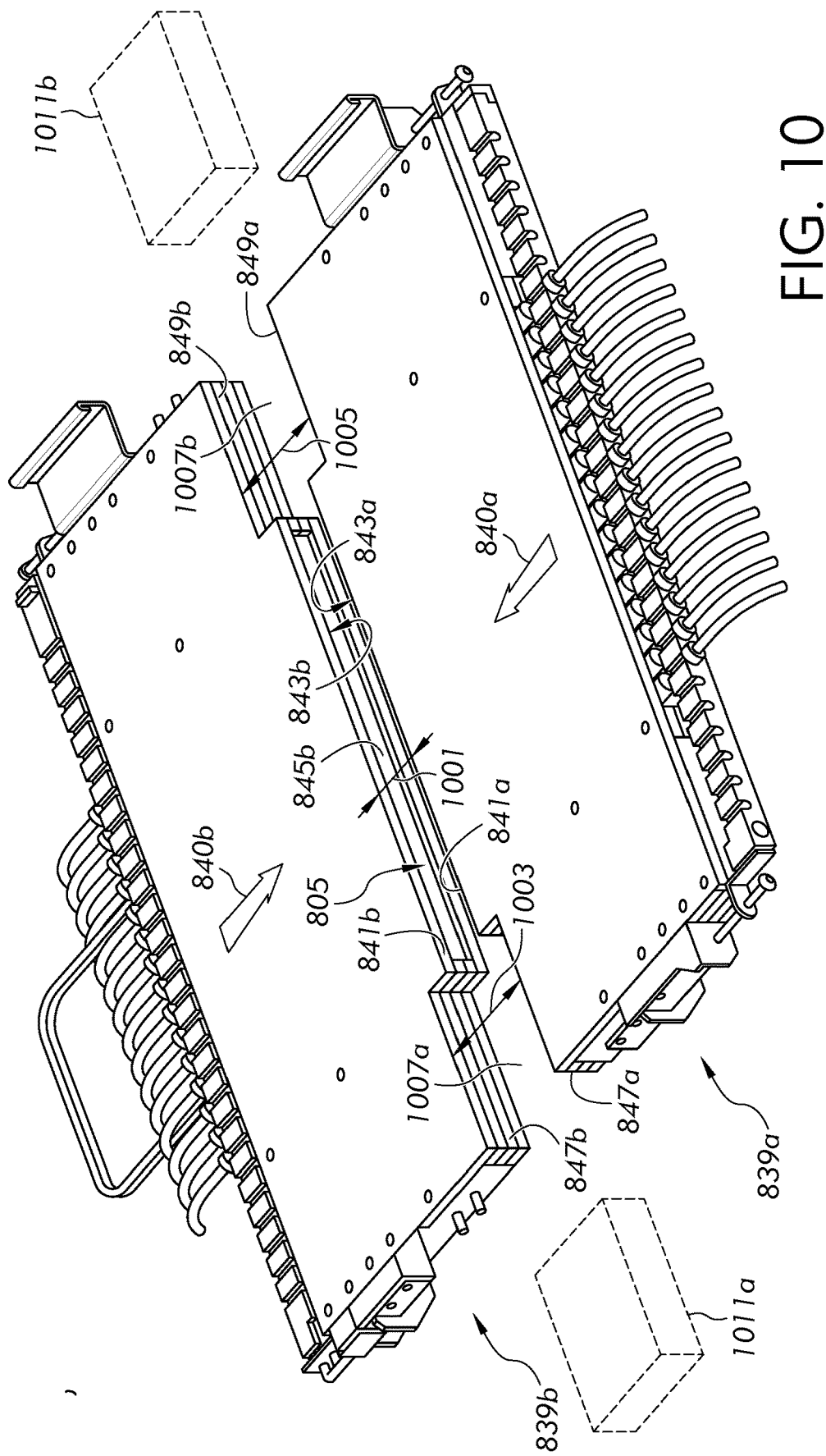
FIG. 10 illustrates a perspective view of a first gate and a second gate of the draw stack along line 10-10 of FIG. 8.

As shown in FIG. 10, a width 1001 of the inlet 805 can be defined between the outer surface 843a of the first central edge plate 845a and the outer surface 843b of the second central edge plate 845b. The width 1001 can be adjustable to control the rate that the first quantity 817 of the input gas 819 exits the inlet 805. For example, the width 1001 of the inlet 805 can be reduced to reduce the rate that the first quantity 817 of the input gas 819 exits the inlet 805 by moving the first gate 839a in the first extension direction 840a and by moving the second gate 839b in the second extension direction 840b opposite the first extension direction 840a. The first gate 839a and the second gate 839b can be moved in retraction directions (opposite the extension directions) to increase the width 1001 of the inlet 805 to increase the rate that the first quantity 817 of the input gas 819 exits the inlet 805.

In some embodiments a distance 1003 in the first extension direction 840a between the first lateral edge 847a and the third lateral edge 847b can be from about two times the width 1001 of the inlet 805 to about ten times the width 1001 of the inlet 805, for example, from about two times the width 1001 of the inlet 805 to about five times the width 1001 of the inlet 805. As shown in FIG. 10, the distance 1003 can comprise a width of a first lateral space 1007a that can facilitate radiation of the edges of a glass ribbon 103 positioned between the outer surfaces 843a, 843b of the central edge plates 845a, 845b.

In further examples, a distance 1005 in the first extension direction 840a between the second lateral edge 949a and the fourth lateral edge can be from about two times the width 1001 of the inlet 805 to about ten times the width 1001 of the inlet 805, for example, from about two times the width 1001 of the inlet 805 to about five times the width 1001 of the inlet 805. As shown in FIG. 10, the distance 1005 can comprise a width of a second lateral space 1007b that can facilitate radiation of the edges of a glass ribbon 103 positioned between the outer surfaces 843a, 843b of the central edge plates 845a, 845b.

Methods of cooling a glass ribbon 103 with the draw stack 159 will now be described. Glass ribbon 103 traveling in the travel direction 154 can pass through the inlet 805 of the stack. In some embodiments, the entire width of the glass ribbon 103 can be disposed within the width 1001 of the inlet 805 between the outer surfaces 843a, 843b of the central edge plates 845a, 845b. In some embodiments, the glass ribbon 103 travels within the interior area 803 in the travel direction 154 from the inlet 805 towards the outlet 807 while the first outer edge 153 and the second outer edge 155 of the glass ribbon 103 passes between the outer surface 843a of the first central edge plate 845a and the outer surface 843b of the second central edge plate 845b.

As the glass ribbon 103 is still in the visco-elastic zone 813a, the width of the ribbon can be reduced by the pull rollers 810a. To further influence the thickness of the glass ribbon 103 and/or cooling of the glass ribbon 103, the method can comprise delivering gas from a source of gas (not shown), through the conduit and emitted from the outlet 859a of at least one conduit of the first row of conduits 855a to convect heat from the first central edge plate 845a and emitting gas from the outlet 859b of at least one conduit of the second row of conduits 855b to convect heat from the second central edge plate 845b. The central edge plates can act as radiative heat sinks for radiative heat transfer from the glass ribbon 103 to the central edge plates.

In some embodiments, the method can include cooling the width "W" of the glass ribbon 103 positioned between the outer surface 843a of the first central edge plate 845a and the outer surface 843b of the second central edge plate 845b by radiating heat from the width "W" of the glass ribbon 103 to the first central edge plate 845a and the second central edge plate 845b.

As shown in FIG. 11, in some embodiments, the conduits of the first gate 839a can be uniformly spaced apart from one another by passing through corresponding apertures 1103a of an alignment member 1101. The empty apertures 1103b can be used in the second gate 839b to uniformly space the conduits while the apertures 1103a in the alignment member 1101 of the second gate 839b may be empty. As such, the first row of conduits 855a can be staggered relative to the second row of conduits 855b in the direction of the width of the glass ribbon 103 to allow more control of the thermal profile across the width of the glass ribbon 103. Further thickness changes across the width of the glass ribbon 103 may be achieved by modifying the flow rates of the gas being admitted by one or more of the conduits of the first and/or second rows of conduits 855a, 855b. For example, a difference between flow rates of gas being admitted by at least two conduits of the first row of conduits 855a can be adjusted to adjust a thickness profile across the width of the glass ribbon. In addition or alternatively, a difference between flow rates of gas being admitted by at least two conduits of the second row of conduits 855b can be adjusted to further adjust the thickness profile across the width of the glass ribbon.

In some embodiments, the methods can further comprise cooling the first outer edge 153 of the glass ribbon 103 by radiating heat through the first lateral space 1007a between the first lateral edge 847a and the third lateral edge 847b. In further embodiments, the methods can comprise cooling the second outer edge 155 of the glass ribbon 103 by radiating heat through the second lateral space 1007b between the second lateral edge 849a and the fourth lateral edge 849b. In some embodiments, methods can comprise adjusting the width 1001 of the inlet 805 such that the distance 1003 in the first extension direction 840a between the first lateral edge 847a and the third lateral edge 847b is from about two times the width 1001 of the inlet 805 to about ten times (or about five times) the width 1001 of the inlet 805. In further embodiments, methods can comprise adjusting the width 1001 of the inlet 805 such that the distance 1005 in the first extension direction 840a between the second lateral edge 849a and the fourth lateral edge 849b is from about two times the width 1001 of the inlet 805 to about ten times (or about five times) the width 1001 of the inlet 805.

The lateral spaces 1007a, 1007b with the corresponding distances 1003, 1005 can provide space for radiative heat transfer from the outer edges 153, 155 that can facilitate cooling of the glass ribbon 103 passing through the inlet 805. To further enhance radiative heat transfer, the method can cool the first outer edge 153 of the glass ribbon 103 by radiating heat through the first lateral space 1007a to a first fluid cooled element 1011a (shown schematically in broken lines). The method can further cool the second outer edge 155 of the glass ribbon 103 by radiating heat through the second lateral space 1007b to a second fluid cooled element 1011b (shown schematically in broken lines). The first and second fluid cooled elements 1011a, 1011b are shown laterally spaced away from the corresponding lateral spaces 1007a, 1007b. Although not shown, the fluid cooled elements may be located above or below the gates 839a, 839b. Although not shown, the fluid cooled elements may be located at least partially within the lateral spaces 1007a, 1007b or laterally within the lateral spaces 1007a, 1007b while being disposed above or below the lateral spaces 1007a, 1007b.

After passing through the inlet 805, the glass ribbon 103 can optionally be further exposed to one or more other cooling elements 863 to help control the cooling of the glass ribbon 103 while the glass ribbon passes through the visco-elastic zone 813a. The wall 801 within the setting zone 813b and/or within the elastic zone 813c may include heating and/or cooling elements to further control cooling of the glass ribbon 103.

In some embodiments, the disclosure provides a housing 825 and baffle 833 that can split an input gas 819 into a first quantity 817 of input gas and a second quantity 835 of input gas. The first quantity 817 of input gas may travel upwardly through the interior area 803 to help convective heat transfer cooling of the glass ribbon 103 traveling in the travel direction 154 within the interior area 803. Adjusting the vents 829 can help adjust the proportion of first quantity 817 to the second quantity 835 of input gas 819 to help fine tune the extent that the glass ribbon 103 is cooled by the first quantity 817 passing upward through the interior area 803. Furthermore, the width 1001 of the inlet 805 can be adjusted by the first and second gates 839a, 839b to help control the rate that the first quantity 817 of input gas exits the interior area 803 to further control cooling of the glass ribbon 103 within the draw stack 159. Still further, the gates 839a, 839b can include conduits 855a, 855b to allow thickness control of the glass ribbon 103 wherein a desired thickness profile can be provided by adjusting the gas flow rate through the conduits 855a, 855b. Furthermore, the gates 839a, 839b can be arranged with lateral spaces 1007a, 1007b that can have larger widths than the width 1001 of the inlet 805 to facilitate radiative cooling of the outer edges 153, 155 of the glass ribbon 103. Still further, the draw stack 159 can be supported by a support apparatus 161 to permit movement of the draw stack 159 to a service location for servicing the draw stack without the need to stop the glass production process as the draw stack 159 is out of alignment with the forming device 140 in the service location.

It should be understood that while various embodiments have been described in detail with respect to certain illustrative and specific examples thereof, the present disclosure should not be considered limited to such, as numerous modifications and combinations of the disclosed features are possible without departing from the scope of the following claims.

What is claimed is:

1. An apparatus for forming a glass ribbon comprising:
a draw stack comprising a wall circumscribing an interior area comprising an inlet, and an outlet located downstream from the inlet, the draw stack further comprising at least one pull stage within the interior area, each pull stage of the at least one pull stage comprising a first pair of rollers configured to grip a first outer edge of the glass ribbon and a second pair of pull rollers configured to grip a second outer edge of the glass ribbon, wherein the draw stack comprises a locked orientation configured to inhibit lateral movement of the draw stack and an unlocked orientation configured to enable lateral movement of the draw stack; and a support member movable from a retracted position to an extended position to increase an elevation of the draw stack to move the draw stack from the locked orientation to the unlocked orientation, the support member movable from the extended position to the retracted position to reduce the elevation of the draw stack to move the support member from the unlocked orientation to the locked orientation, the support member comprising an end portion.

2. The apparatus of claim 1, wherein the end portion comprises an air bearing configured to levitate the draw stack on a cushion of gas.

3. The apparatus of claim 1, wherein the lateral lock comprises a protrusion and a recess, wherein the protrusion is disposed within the recess in the locked orientation and the protrusion is configured to be positioned outside the recess in the unlocked orientation.

4. The apparatus of claim 1, further comprising a track receiving the end portion of the support member to define a lateral travel path of the draw stack.

5. The apparatus of claim 4, wherein the track comprises a channel receiving the end portion, and the end portion comprises an air bearing configured to produce a cushion of gas within the channel to levitate and self-align the end portion within the channel.

6. A method comprising:

moving a glass ribbon in a downward direction through an interior area of a draw stack while the draw stack is supported on a support surface and while an inlet of the interior area of the draw stack is aligned to receive the glass ribbon;

lifting the draw stack in a vertically upward direction to move the draw stack from a locked orientation to an unlocked orientation to enable movement of the draw stack in a lateral direction; and moving the draw stack in the lateral direction relative to the support surface when the draw stack is in the unlocked orientation such that the inlet of the interior area is not aligned to receive the glass ribbon.

7. The method of claim 6, wherein, after moving the draw stack, the method comprises continuing to move the glass ribbon in the downward direction without passing through the interior area of the draw stack.

8. The method of claim 7, wherein continuing to move the glass ribbon in the downward direction without passing through the interior area of the draw stack comprises the draw stack positioned entirely outside a flow path of the glass ribbon.

9. The method of claim 6, wherein a support member lifts the draw stack in the vertically upward direction, wherein an end portion of the support member is received by a track mounted relative to the support surface, and the end portion of the support member is guided by the track to provide movement of the draw stack in the lateral direction.

10. The method of claim 9, wherein the end portion is positioned within a channel of the track, and the end portion comprises an air bearing producing a cushion of gas while moving the draw stack in the lateral direction to center the end portion within the channel and reduce a force to move the draw stack in the lateral direction.

11. The method of claim 6, wherein the draw stack is levitated on a cushion of gas while moving the draw stack in the lateral direction.

12. An apparatus for forming a glass ribbon comprising:

a draw stack comprising a wall circumscribing an interior area comprising an inlet, and an outlet located downstream from the inlet, the draw stack further comprising at least one pull stage within the interior area, each pull stage of the at least one pull stage comprising a first pair of rollers configured to grip a first outer edge of the glass ribbon and a second pair of pull rollers configured to grip a second outer edge of the glass ribbon;

a track to define a lateral travel path of the draw stack; and a support member comprising an end portion received by the track, wherein the track is configured to guide the end portion along the lateral travel path of the draw stack.

13. The apparatus of claim 12, wherein the track comprises a channel receiving the end portion, and the end portion comprises an air bearing configured to produce a cushion of gas within the channel to levitate and self-align the end portion within the channel.

14. The apparatus of claim 12, further comprising a lateral lock configured to lock the draw stack in the locked orientation.

15. The apparatus of claim 14, wherein the lateral lock comprises a protrusion and a recess, wherein the protrusion is disposed within the recess in the locked orientation and the protrusion is configured to be positioned outside the recess in the unlocked orientation.

16. A method comprising:

moving a glass ribbon in a downward direction through an interior area of a draw stack while the draw stack is supported by a support member comprising an end portion received by a track mounted relative to a support surface and while an inlet of the interior area of the draw stack is aligned to receive the glass ribbon; and moving the draw stack in a lateral direction relative to the support surface by guiding the end portion of the support member by the track to provide movement of the draw stack in the lateral direction such that the inlet of the interior area is not aligned to receive the glass ribbon.

17. The method of claim 16, wherein the end portion is positioned within a channel of the track, and the end portion comprises an air bearing producing a cushion of gas while moving the draw stack in the lateral direction to center the end portion within the channel and reduce a force to move the draw stack in the lateral direction.

18. The method of claim 16, wherein, after moving the draw stack, the method comprises continuing to move the glass ribbon in the downward direction without passing through the interior area of the draw stack.

19. The method of claim 18, wherein continuing to move the glass ribbon in the downward direction without passing through the interior area of the draw stack comprises the draw stack positioned entirely outside a flow path of the glass ribbon.

* * * * *